United States Patent [19]

Swodenk et al.

[11] B 3,925,452

[45] Dec. 9, 1975

[54] PROCESS FOR THE PRODUCTION OF ALLYL ACETATE

[75] Inventors: Wolfgang Swodenk, Odenthal-Globusch; Gerhard Scharfe, Leverkusen, both of Germany

[73] Assignee: Bayer Aktiengesellschaft, Leverkusen, Germany

[22] Filed: Feb. 7, 1973

[21] Appl. No.: 330,536

[44] Published under the Trial Voluntary Protest Program on January 28, 1975 as document no. B 330,536.

Related U.S. Application Data

[63] Continuation-in-part of Ser. No. 15,700, March 2, 1970, abandoned.

[30] Foreign Application Priority Data

Mar. 5, 1969 Germany............................ 1911178

[52] U.S. Cl............................................. 260/497 A
[51] Int. Cl.²......................................... C07C 67/04
[58] Field of Search............................... 260/497 A

[56] References Cited

UNITED STATES PATENTS

| 3,275,680 | 9/1966 | Holzrichter | 260/497 A |
| 3,517,054 | 6/1970 | Ketley | 260/497 A |

FOREIGN PATENTS OR APPLICATIONS

| 771,193 | 11/1967 | Canada | 260/497 |

*Primary Examiner*—Lorraine A. Weinberger
*Assistant Examiner*—Richard D. Kelly
*Attorney, Agent, or Firm*—Burgess, Dinklage & Sprung

[57] ABSTRACT

A process for the production of allyl acetate, which is useful for the production of allylic alcohol, wherein propylene, oxygen and acetic acid are reacted over a supported palladium catalyst, in the presence of water vapor and under control of the water:acetic acid ratio to yield a liquid product that separates into an upper, substantially pure allyl acetate, phase and a lower, substantially pure water, phase.

12 Claims, 1 Drawing Figure

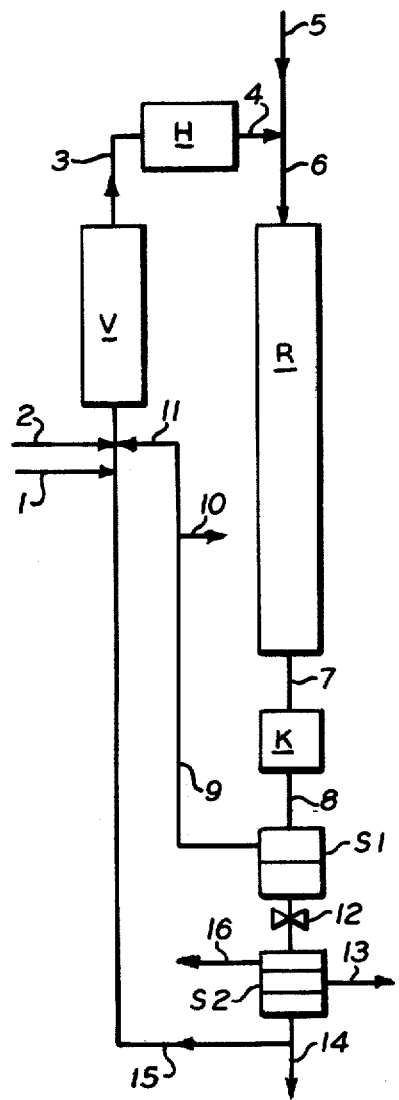

PROCESS FOR THE PRODUCTION OF ALLYL ACETATE

This application is a continuation-in-part of Ser. No. 15,700 filed Mar. 2, 1970, and now abandoned.

This invention relates to a process for making allyl acetate, particularly to a process for making this material in high yield and purity.

It is known that allyl acetate can be produced by reacting propylene, oxygen, and acetic acid over a palladium-containing catalyst. However, prior processes involving this reaction have been found not entirely satisfactory in terms of the yields of the allyl acetate produced and ease of separating the desired product from the reaction product mixture.

It has now been found that by proceeding in accordance with the invention the production of allyl acetate by reacting propylene, oxygen and acetic acid in the gaseous phase in the presence of a palladium catalyst can be substantially improved to yield, in a simple manner, a pure allyl acetate phase.

In accordance with the invention, water is supplied to the reaction and the water: acetic acid ratio controlled to yield a condensable component in the reaction product, consisting essentially of water, allyl acetate and acetic acid, and so less in acetic acid content that it will decompose at a temperature below 50°C and normal or elevated pressure to form an upper phase consisting essentially of allyl acetate and a lower phase consisting essentially of water. In other words, the conversion of acetic acid to allyl acetate achieved by the instant process is so great that the allyl acetate can be recovered by a simple phase separation from the reaction product.

Essentially, the process of the invention comprises reacting propylene, oxygen, and acetic acid in the gaseous phase in the presence of water, over a palladium catalyst at a temperature of 50° to 250°C, and maintaining the water: acetic acid ratio in the feed at from 1 to 100 moles of water per mole of acetic acid. Preferably, the starting materials are used at the following hourly rates:

1 to 3 mols of acetic acid per litre of catalyst,
1 to 100 (preferably 1 to 10) mols of water per mol acetic acid,
1 to 5 mols of oxygen per mol of acetic acid,
4 to 40 mols of propylene and inert components per mol of oxygen The reaction pressure can be up to about 15 atmospheres and is preferably from 3 to 15 atmospheres.

In carrying out the invention the water level is maintained as indicated and the working temperature is adjusted in the range from 50° to 250°C and it is thereby achieved that from 90 to 100 percent of the acetic acid reactant is reacted in a straight throughput. When the gaseous reaction product is cooled to temperatures below 50°C, a liquid upper phase is obtained, consisting essentially of allyl acetate, together with a liquid lower phase consisting essentially of water.

The precise and optimum amount of water used in accordance with the invention will be dependent to some extent on the other reaction conditions and on the nature and activity of the palladium-containing catalyst. For instance, greater amounts of water, e.g. 10 to 100 mols per mol of active acid, might be optimum when catalyst activity or temperature is relatively low; and lesser amounts, e.g. 1 to 10, or even 1 to 5, moles might be sufficient or optimum with relatively highly active catalysts and/or at the preferred reaction temperatures of from 100° to 200°C.

The palladium of the catalyst can be in the form of free palladium metal or in the form of a compound which is preferably substantially free from halogens, sulfur and nitrogen, for example in the form of palladium acetate, palladium benzoate, palladium propionate, palladium acetyl acetonate or palladium hydroxide.

The catalyst advantageously contains an alkali metal compound consisting of an alkali metal acetate or of an alkali metal compound which under the reaction conditions is converted at least partly into an alkali metal acetate, for example formate, propionate, hydroxide, carbonate, phosphate, borate, citrate, tartrate or lactates. Suitable alkali metal compounds include compounds of potassium, sodium, lithium, rubidium and ceasium.

Metals or compounds influencing the activity and selectivity of the catalyst can also be added to the catalyst. Suitable additives of this kind include for example metals of the Vth to VIIIth Groups of the Periodic System and/or gold and/or copper. The metals can also be added in the form of compound substantially free from halogen, sulfur and nitrogen. The following are mentioned as examples of additives: gold, platinum, iridium, ruthenium and rhodium which are present in metal, oxide or hydroxide form, also oxides, hydroxides, acetates, acetyl acetonates, or decomposition and conversion products thereof, of the elements iron, manganese, chromium, tungsten, molybdenum. It is preferred to use an iron compound which is substantially free from halogen, sulfur and nitrogen, as the additive.

The catalyst is preferably applied to a support, such as for example silica, natural and synthetic silicates, active carbon, aluminium oxide, spinels, pumice or titanium dioxide. It is preferred to use supports of the kind which have a high chemical resistence to water and acetic acid such as silica for example.

The catalyst can be used for example in the form of pellets, microcylinders or spheres, for example in the form of spheres from 4 to 6 mm in diameter.

The catalyst can be prepared in many different ways, for example a compound of the metal can be dissolved in a solvent, the support impregnated with the resulting solution and then dried. It is also possible, however, to impregnate the support successively with the components which can then be converted, if required, by an intermediate treatment, such as calcination, or chemical reactions such as for example treatment with solutions of an alkali metal hydroxide, alkali metal carbonate or a reducing agent. The catalysts can be prepared from a compound containing sulfur, nitrogen or halogen, such as for example sodium palladium chloride, tetrachloroauric acid, iron chloride, copper nitrate or manganese sulfate, which compound is then converted on the support into an insoluble compound which is substantially free from sulfur, nitrogen and halogen such as for example palladium metal, palladium oxide, iron hydroxide, gold hydroxide, copper hydroxide and manganese oxide, after which the catalyst is freed by washing from nitrogen, sulfur and halogen compounds.

For example, organic palladium and iron compounds can be applied together in solution in an organic solvent, followed by drying at temperatures of from 50° to 150°C, after which the alkali metal acetate is applied from an aqueous solution and the catalyst dried at temperatures of from 50° to 200°C. The organic palladium and iron compounds can be partly or completely decomposed or converted under the drying conditions. The catalyst thus obtained can be treated with liquid or gaseous methanol, ethylene or propylene, so that the palladium compound is reduced to the palladium metal. Before the reaction with propylene, acetic acid and oxygen to form allyl acetate in the gaseous phase, the catalyst can also be treated with propylene and water, optionally acetic acid and/or nitrogen and/or carbon dioxide, in which case the palladium compound may be partly or completely reduced to the palladium metal.

In a preferred embodiment for producing the catalyst, palladium acetyl acetonate and optionally iron acetyl acetonate are dissolved in benzene, the resulting solution applied to the catalyst support which is then dried at from 80° to 100°C, after which potassium acetate is applied from an aqueous solution, the catalyst heated at from 100° to 130°C and then treated in the gaseous phase at from 50° to 250°C, optionally under pressure, with propylene and water and optionally acetic acid. Technically, it is of advantage to carry out this treatment in the reactor before the actual reaction giving allyl acetate, i.e. before the oxygen is added.

In another preferred embodiment for preparing the catalyst, the support or substrate, for example silica, is impregnated with an aqueous sodium-palladium chloride solution according to the absorbency of the substrate, dried and converted with an aqueous sodium hydroxide solution of the sodium palladium chloride into a water-soluble palladium compound, for example, palladium hydroxide. The water-insoluble palladium compound is reduced to the palladium metal by treatment with aqueous hydrazine hydrate, the catalyst is then freed by washing from chlorides and hydrazine, dried and subsequently impregnated with potassium acetate.

The completed catalyst advantageously contains, expressed as the metal, from 1 to 10 g. of Pd, also from 1 to 100 g. of an alkali metal acetate per litre of the catalyst. In cases where another metal or a metal compound is used as an additive, the completed catalyst may contain this metal, expressed as the metal, for example in quantities of from 0.1 to 10 g.

The starting materials required for the preparation of the allyl acetate should preferably be free from halogen, sulfur and nitrogen compounds.

The gas entering the reactor can contain in addition to propylene, oxygen, acetic acid and water, inert constituents such as for example propane, carbon dioxide, nitrogen and argon. The oxygen concentration at the inlet end of the reactor is advantageously selected in such a way that the explosion limit of the gaseous mixture present in the reactor is not exceeded.

The quantities of acetic acid and water are selected so that the reactants are in the gaseous phase under the reaction conditions, a pressure of 3 to 15 atmospheres is preferred.

Whereas in cases where water is used in small quantities the alkali metal acetate gradually is removed from the catalyst, this is generally not the case when the procedure according to the invention is applied. If necessary, alkali metal acetate can be added by introducing a small quantity, for example in the form of a dilute solution of an alkali metal acetate in water and/or acetic acid, into the hot gaseous stream before it enters the reaction phase. In this connection, the solution can be sprayed directly as a liquid into the hot gaseous stream, where it evaporates.

The reaction is advantageously carried out in tubular reactors. Suitable dimensions for the reaction tubes are for example lengths of from 4 to 8 meters and internal diameters of for example from 20 to 50 mm. The heat of reaction can be advantageously dissipated by boiling cooling liquids circulating around the outside of the reaction tubes, for example water under pressure.

The reaction can be carried out for example by passing a recycle gas consisting essentially of propylene, oxygen and inert constiuents, such as carbon dioxide, propane, nitrogen, argon, under pressure through an evaporator containing water and acetic acid, and charging the recycle gas with the requisite quantity of acetic acid and water by suitably selecting the composition of the liquid product in the evaporator and through the temperature prevailing in the evaporator. The gaseous mixture is then heated to the reaction temperature under pressure, and the oxygen required for the reaction introduced.

For the purpose of the process according to the invention, water and acetic acid are used in such a ratio in the starting material which enters the reactor as a gas, that the condensable components present in the reaction product, consisting essentially of water, allyl acetate and small amounts of acetic acid, disintegrate at temperatures below 50°C at a normal or an elevated pressure to form an upper phase consisting essentially of allyl acetate and a lower phase consisting essentially of water. The process can be carried out by cooling the gaseous reaction mixture under the reaction pressure to temperatures below 50°C, for example to 20°C, and separating it in a separator at the reaction pressure into an upper phase and a lower phase. The upper phase, consisting essentially of allyl acetate, can be run off from the separator under pressure and in general can be used without further pretreatment, for example as a starting material for chemical syntheses. The upper phase can also be relieved of pressure in a pressure-free separator, in which case the reaction mixture can be brought to a relatively high or relatively low temperature before or after pressure release, any components of a lower phase formed being separated off.

The upper phase thus obtained consisting essentially of allyl acetate can generally be used without further pretreatment, for example as a starting material for chemical synthesis, for example glycerin. It is also possible, however, to separate off other compounds present in the upper phase in addition to allyl acetate, for example water and/or acetic acid, for example by distillation, and to isolate the allyl acetate in the pure form.

The lower phase present in the pressure separator consisting essentially of water can be recycled either completely or in part of the acetic acid-water evaporator and from there used as a gas for the production of allyl acetate. It is also possible, however, to relieve the lower phase of pressure in a pressure-free separator, in which case the product can be brought to relatively high or relatively low temperature before or after pressure release and any components of an upper phase formed separated off. The lower phase thus obtained can be recycled either wholly or in part to the acetic acid-water evaporator and from there used as a gas for the production of allyl acetate. Any allyl acetate dissolved in the lower phase can also be initially separated, for example by distillation, and the aqueous phase subsequently recycled, either wholly or in part.

Water is formed as a reaction product during the reaction of propylene, oxygen and acetic acid into allyl acetate. In addition, small quantities of carbon dioxide are formed as a secondary product during the reaction. In this case, too, water is formed during the reaction in small quantities. This water can be removed at a suitable point during the working of the process and run off as an effluent either directly of following removal of the allyl acetate present in it and optionally following removal of the acetic acid present in it.

To prevent the formation and accumulation, if any, of relatively high-boiling compounds in the sump of the acetic acid-water evaporator, small quantities of the sump of the acetic acid-water evaporator can be run off either continuously or at intervals and recycled optionally after purification, for example by redistillation.

The gaseous phase accumulating during condensation following separation of the liquid components consists essentially of unreacted propylene and unreacted oxygen, carbon dioxide and optionally inert constituents, such as propane, nitrogen and argon. The gaseous phase contains certain quantities of the condensable reaction products, such as water, allyl acetate, acetic acid, depending upon the temperature and the pressure at which liquid components are separated. The gaseous phase can be recycled under the reaction pressure directly to the reaction or to the acetic acid-water evaporator. It is also possible, however, to obtain further liquid components by changing the temperature and/or the pressure and to recycle the gas following separation of these liquid constituents. It is also possible to reduce the condensible components in the gas, for example the allyl acetate, before recycling by washing the gas with suitable solvents, for example acetic acid.

The gas given off during depressurization of the liquid phase can be compressed and suitably recycled.

The carbon dioxide formed as a secondary product during the reaction of the propylene into allyl acetate can be recycled to the reaction. In order to prevent excessive accumulation of the carbon dioxide, a component stream of the recycle gas can be taken from the return circuit and a constant carbon dioxide content thus adjusted in the recycle gas, for example from 20 to 30 percent, based on the recycle gas. The component stream can be returned to the recycle gas following separation of the carbon dioxide.

By virtue of the process according to the invention, it is possible to obtain in an economically advantageous manner a reaction material consisting essentially of allyl acetate which can be directly used as a starting material for chemical syntheses and from which a pure allyl acetate can be isolated in a simple manner. By virtue of the process according to the invention, it is possible to obtain an almost complete reaction of the acetic acid used so that following condensation an upper phase substantially free from acetic acid and a lower phase substantially free from acetic acid are obtained, the upper phase containing essentially only dissolved water in addition to allyl acetate whilst the lower phase essentially only contains dissolved allyl acetate in addition to water. Since the solubility of allyl acetate in water is limited and the solubility of water in allyl acetate equally limited, extensive isolation of the allyl acetate from the reaction product is obtained in this way without any need for distillation.

A specific embodiment of the invention may be better understood with reference to the accompanying drawing which is a simplified flow diagram:

Fresh propylene is passed through line 1 and a recycle gas essentially consisting of propylene, oxygen and carbon dioxide is passed through line 11 to the evaporator V containing water and acetic acid. Acetic acid is introduced in line 2. The mixture of propylene, oxygen, carbon dioxide, water and acetic acid streams as a gas via line 3 to the superheater H wherein the mixture is heated up to the reaction temperature. The gas streams to the reactor R via lines 4 and 6. Fresh oxygen is introduced via line 5. The gaseous reaction product is passed to the cooler K via line 7 and then streams via line 8 to the separator S 1 wherein separation into a gaseous and a liquid phase takes place. The gaseous phase is passed to the evaporator via lines 9 and 11. A small component stream is taken from this stream via line 10 to avoid an undesired accumulation of the carbon dioxide formed in the reaction in the recycle gas. The lower phase of the separator S 1 is passed to a separator S 2 via a pressure relief valve 12. In the evaporator S 2 there is obtained a residual gas which is taken off via line 16 and which can be returned to the evaporator V via line 9 and 11 after compression. In the separator S 2 separation takes place into an upper phase consisting essentially of allyl acetate and a lower phase consisting essentially of water. The crude allyl acetate containing dissolved water and, if any, small quantities of acetic acid is taken off via line 13. The crude allyl acetate can be directly used for syntheses, but it is possible to obtain therefrom pure allyl acetate by distillation in known manner. The lower phase which consists essentially of water and which may contain small quantities of acetic acid is passed to the evaporator V via line 15. Part of the lower phase which corresponds to the quantity of the water formed as a product during the reaction is taken from the circuit via line 14. Fresh acetic acid is admitted via line 1.

EXAMPLES

Example 1

A silica support with an internal surface area of 100 $m^2/g$. in the form of spheres 5 mm. in diameter is impregnated with a solution of palladium acetyl acetonate in benzene and dried.

The support is then impregnated with a solution of potassium acetate in water and redried. The catalyst thus obtained is treated for two hours at 150°C with propylene in the absence of pressure. Analysis shows that the palladium is reduced to the palladium metal. The catalyst thus obtained contains 3.3 g of Pd metal and 30 g. of potassium acetate per litre of the catalyst.

2,350 ml. of the catalyst are introduced into a reaction tube 5 metres long with an internal diameter of 25 mm. Boiling water under pressure flows around the outside of the reaction tube. The catalyst is heated to 140°C. in a stream of propylene under a pressure of 5 atms. Water is then pumped into a pressure evaporator and the propylene passed through the evaporator at 120°C under a pressure of 5 atms. The product leaving the reactor in the gaseous phase is cooled to 20°C under pressure and separated in a separator into a gaseous phase and a liquid phase. The gaseous phase is relieved of pressure through a pressure-retaining valve. The liquid phase is relieved of pressure in a pressure-free separator. The gas formed through depressurisation is combined with the gas-stream behind the pressure-retaining valve. The lower phase consisting of water is pumped back into the pressure evaporator. After this circuit has been adjusted, oxygen is introduced at the inlet end of the reactor and 66 mols/hour of propylene and 7 mols/hour of oxygen are then passed over the catalyst, all the propylene being passed through the pressure evaporator kept at 120°C at 5 atms. pressure, as a result of which it is charged with steam. The mixture of propylene and steam is preheated to 140°C in a superheater. Acetic acid is then pumped into the pressure evaporator and the reaction temperature is adjusted so that at least 95 percent by weight of the acetic acid used is reacted in a straight throughput. After the acetic acid has been added, an upper phase consisting essentially of allyl acetate and a lower phase consisting essentially of water are formed in the separators by layer separation after the gaseous reaction product has cooled to 20°C. The lower phase is pumped back into the pressure separator, a small proportion of the lower phase which corresponds to the water formed as a product during the reaction is taken from the circuit.

The upper phase is freed from dissolved water by distillation. The water which accumulates is combined with the excess of the lower phase which is taken from the circuit. The lower phase is freed from the allyl acetate dissolved in the water by distillation and the allyl acetate obtained combined with the upper phase before drying. The quantity of acetic acid and the reaction temperature are regulated so that from 200 to 220 g per hour of pure allyl acetate are formed per litre of catalyst, from 98 to 100 percent of the acetic acid introduced being reacted in a straight throughput.

After a reaction time of 100 hours, constant conditions prevail. Over a test period of from 100 to 500 hours, the following test results were obtained: temperature in the reactor 164°C, space/time yield in g of allyl acetate/litre of catalyst and hour: 217, acetic acid conversion in a straight throughput 99 percent, selectivity based on propylene reacted 94 percent for allyl acetate and 6 percent for carbon dioxide. The condensate had a potassium content of less than 0.5 ppm.

Example 2

The test was carried out in the same way as in Example 1 except that different catalysts were used, their preparation being described in the following:

Catalyst A: Aluminium oxide with an internal surface are of about 5 to 10m²/g., in the form of microcylinders 3 to 4 mm. in diameter and 5 to 6 mm long, is impregnated with a sodium palladium chloride solution, after which the palladium is reduced to the palladium metal by an alkaline hydrazine hydrate solution. The catalyst is then washed with water, dried, impregnated with a potassium acetate solution and then dried. The catalyst thus obtained contains 0.5 percent by weight of palladium in the form of the palladium metal and 30 g. of potassium acetate per litre of the catalyst.

Catalyst B: Silica with an inner surface of 160 m²/g in the form of spheres 5 mm in diameter is impregnated with an aqueous solution of sodium palladium chloride and tetrachloroauric acid, dried and then impregnated with an aqueous solution of sodium hydroxide and then redried. In this way the soluble noble metal compounds are converted into water-insoluble noble metal compounds. The noble metal compounds are then reduced by aqueous hydrazine hydrate into their metallic form, the catalyst is wahsed and dried, potassium acetate applied and the catalyst redried. The completed catalyst contains per litre of catalyst 3.3 g of palladium and 1.5 g. of gold as metals and 30 g. of potassium acetate.

Catalyst C: The catalyst is prepared as in Example 1 except that it is impregnated with a mixture of palladium acetyl acetonate and iron acetyl acetonate instead of with palladium acetyl acetonate. The completed catalyst contains 3.3 g of Pd, 0.6 g. of Fe and 30 g. potassium acetate.

The results obtained with the catalyst over a test period of 100 to 500 hours are set out in the following:

|  | Catalyst | | |
|---|---|---|---|
|  | A | B | C |
| Temperature (°C). | 144 | 169 | 166 |
| space/time yield in grams of allyl acetate/litre of catalyst per hour | 201 | 203 | 215 |
| Acetic acid conversion in a straight throughput in % | 96 | 98 | 99 |
| Selectivity based on reacted propylene: | | | |
| a) for allyl acetate | 90 | 92 | 94 |
| b) for carbon dioxide | 10 | 8 | 6 | less than 0.5 ppm of potassium was present in the condensates.

Example 3

The procedure is as in Example 2 using catalyst B except that a substrate with an internal surface area of 120 m²/g is used, while the noble metal salt solution used is simply a solution of sodium-palladium chloride. The completed catalyst contains per litre of catalyst 3.3 g. of palladium in the metal form and 30 g. of potassium acetate. Results very similar to those of Example 2 with catalyst B are obtained.

Example 4

The following comparative experiments (A and B) were carried out to demonstrate the criticality of employing water, in accordance with the invention, to achieve high conversions of acetic acid and high yields of allyl acetate:

The catalyst in both experiments A and B was prepared as follows: a silica carrier with an internal surface of 120 m²/g in the form of spheres 5mm in diameter was impregnated with a solution of palladium acetyl acetonate and iron acetyl acetonate in benzene and dried. The support was then impregnated with a solution of potassium acetate in water and redried. The completed catalyst contained, per liter of catalyst, 3.3 grams of palladium in the form of palladium acetyl acetonate; 0.6 grams of iron in the form of iron acetyl acetonate; and 30 grams of potassium acetate.

Experiment A 900 ml of the above catalyst were introduced into a reactor tube 2 meters long with an internal diameter of 25 mm. At a temperature of 143°C and a pressure of 5 atm.(guage) the following amounts in moles per liter of catalyst per hour were conducted over the catalyst: 15 moles of water; 42 moles of propylene; 3 moles of oxygen; 1.7 moles of acetic acid. The mole ratio of water: acetic acid was 8:8:1. The results are set forth in Table 1.

Experiment B 900 ml of the above catalyst were introduced into a reactor tube 2 meters long with an internal diameter of 25 mm. At a temperature of 143°C and a pressure of 5 atm.(gauge) the following amounts in moles per liter of catalyst per hour were conducted over the catalyst: No water; 42 moles of propylene; 3 moles of oxygen; 1.7 moles of acetic acid. The results are set forth in Table 1.

Table 1

|  | Experiment A | Experiment B |
|---|---|---|
| Conversion of acetic acid | 91% | 31% |
| Space-time-yield in g allyl acetate per liter of catalyst per hour | 224 | 49 |
| Selectivity | 95% | 91% |

It can thus be seen that dramatic increases in conversion of acetic acid and space-time-yield are achieved by the instant invention.

It will be understood that the specification and examples are illustrative but not limitative of the present invention and that other embodiments within the spirit and scope of the invention will suggest themselves to those skilled in the art.

What is claimed is:

1. Process for the production of allyl acetate wherein propylene, oxygen and acetic acid are reacted in the gaseous phase and in the presence of a catalyst consisting essentially of palladium and alkali metal acetate and, optionally, a Group V to VIII metal, gold, or copper, or compounds thereof, which process comprises supplying the reactants at hourly rates of 1 to 3 moles of acetic acid per liter of catalyst, 1 to 5 moles of oxygen per mole of acetic acid, and 4 to 40 moles of propylene and inert components per mole of oxygen, and supplying water in the feed stream and controlling the ratio of said water to said acetic acid, within the range of 1 to 100 moles of water per mole of acetic acid to result in a conversion of more than 90 percent of the acetic acid introduced per pass.

2. Process as claimed in claim 1, wherein the reaction temperature is from 50° to 250°C.

3. Process as claimed in claim 1, wherein said alkali metal acetate is sodium or potassium acetate.

4. Process as claimed in claim 1, wherein said catalyst contains from 1 to 10 g of Pd expressed as the metal and from 1 to 100 g of the alkali metal acetate per litre of the catalyst.

5. Process as claimed in claim 1, wherein the reaction product is cooled under pressure to a temperature below 50°C. and separated in a separator into a gaseous phase, a liquid upper phase and a liquid lower phase.

6. Process as claimed in claim 5, wherein said reaction product is cooled under pressure to a temperature below 50°C and separated into a liquid phase and a gaseous phase, said liquid product being relieved of pressure in a pressure-free container in which it is separated into an upper phase and a lower phase.

7. Process as claimed in claim 1, wherein said catalyst contains an iron compound.

8. Process as claimed in claim 1, wherein prior to the addition of said oxygen, the catalyst is treated in the gaseous phase with propylene, at a temperature in the range of from 100° to 200°C and at a pressure of up to 10 atms.

9. Process as claimed in claim 1, wherein 1 to 10 moles of water are supplied per mole of acetic acid.

10. Process as claimed in claim 2, wherein the reaction temperature is from 100° to 200°C.

11. Process as claimed in claim 1, wherein the palladium-containing catalyst is palladium metal or a palladium compound substantially free of halogen, sulfur and nitrogen.

12. Process as claimed in claim 1 wherein the reaction pressure is from 3 to 10 atmospheres.

* * * * *